(12) United States Patent
Tang et al.

(10) Patent No.: US 8,456,817 B2
(45) Date of Patent: Jun. 4, 2013

(54) HOUSING AND METHOD FOR MAKING THE SAME

(75) Inventors: Zi-Ming Tang, Shenzhen (CN);
Jing-Hui You, Shenzhen (CN);
Fa-Guang Shi, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 97 days.

(21) Appl. No.: 13/158,589

(22) Filed: Jun. 13, 2011

(65) Prior Publication Data
US 2012/0097687 A1    Apr. 26, 2012

(30) Foreign Application Priority Data
Oct. 26, 2010 (CN) .......................... 2010 1 0520288

(51) Int. Cl.
*H05K 5/00* (2006.01)
*H05K 7/00* (2006.01)
*H01R 13/502* (2006.01)
*H01L 23/02* (2006.01)
*A47B 81/00* (2006.01)
*A47B 88/00* (2006.01)
*A24F 25/00* (2006.01)

(52) U.S. Cl.
USPC ............ 361/679.01; 361/679.03; 361/379.23; 361/679.24; 361/679.29; 174/562; 174/563; 174/564; 174/561; 312/274; 312/312; 312/317.3; 312/223.2; 312/31.1

(58) Field of Classification Search
USPC ............. 361/679.01, 679.02, 679.08, 679.09, 361/679.3, 679.5, 679.51–679.59; 174/250–256
See application file for complete search history.

(56) References Cited

U.S. PATENT DOCUMENTS
2010/0061040 A1*   3/2010   Dabov et al. ............. 361/679.01

\* cited by examiner

*Primary Examiner* — Zachary M Pape
*Assistant Examiner* — Jerry Wu
(74) *Attorney, Agent, or Firm* — Altis Law Group, Inc.

(57) ABSTRACT

A housing includes a bottom housing and a top housing. The bottom housing includes a connecting surface. The top housing includes a bottom surface. The connecting surface is fixed to the bottom surface by welding. A receiving groove is defined in the bottom surface, for receiving the molten slag generated and collected during a welding process.

14 Claims, 6 Drawing Sheets

HOUSING AND METHOD FOR MAKING THE SAME

BACKGROUND

1. Technical Field

The present disclosure relates to housings, and particularly, to a housing formed by welding and a method for making the housing.

2. Description of the Related Art

A housing usually includes a top housing and a bottom housing. The top housing is fixed to the bottom housing by welding to reinforce the structural strength of the housing. However, the molten slag is unavoidably generated during the welding process, and remains between the top housing and the bottom housing, such that a gap between the top housing and the bottom housing may be generated in the welding area, and thereby negatively affecting the welding quality and structural strength of the housing.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
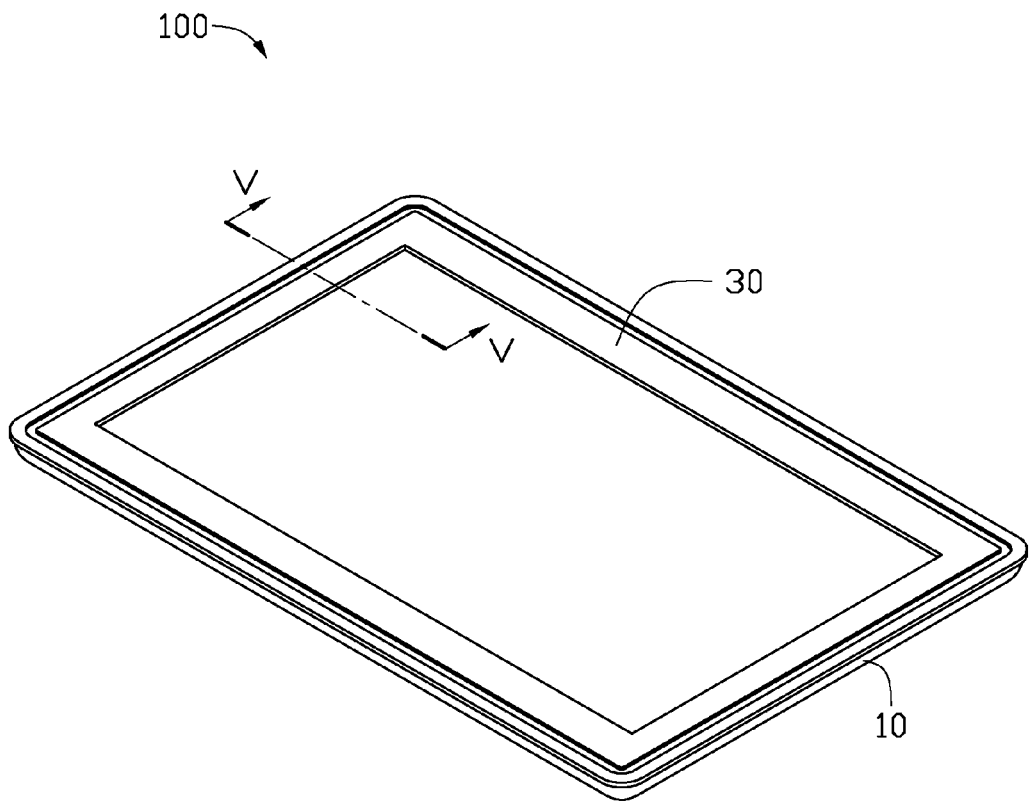
FIG. 1 is an assembled, isometric view of one embodiment of a housing including a top housing and a bottom housing.
Figure 2:
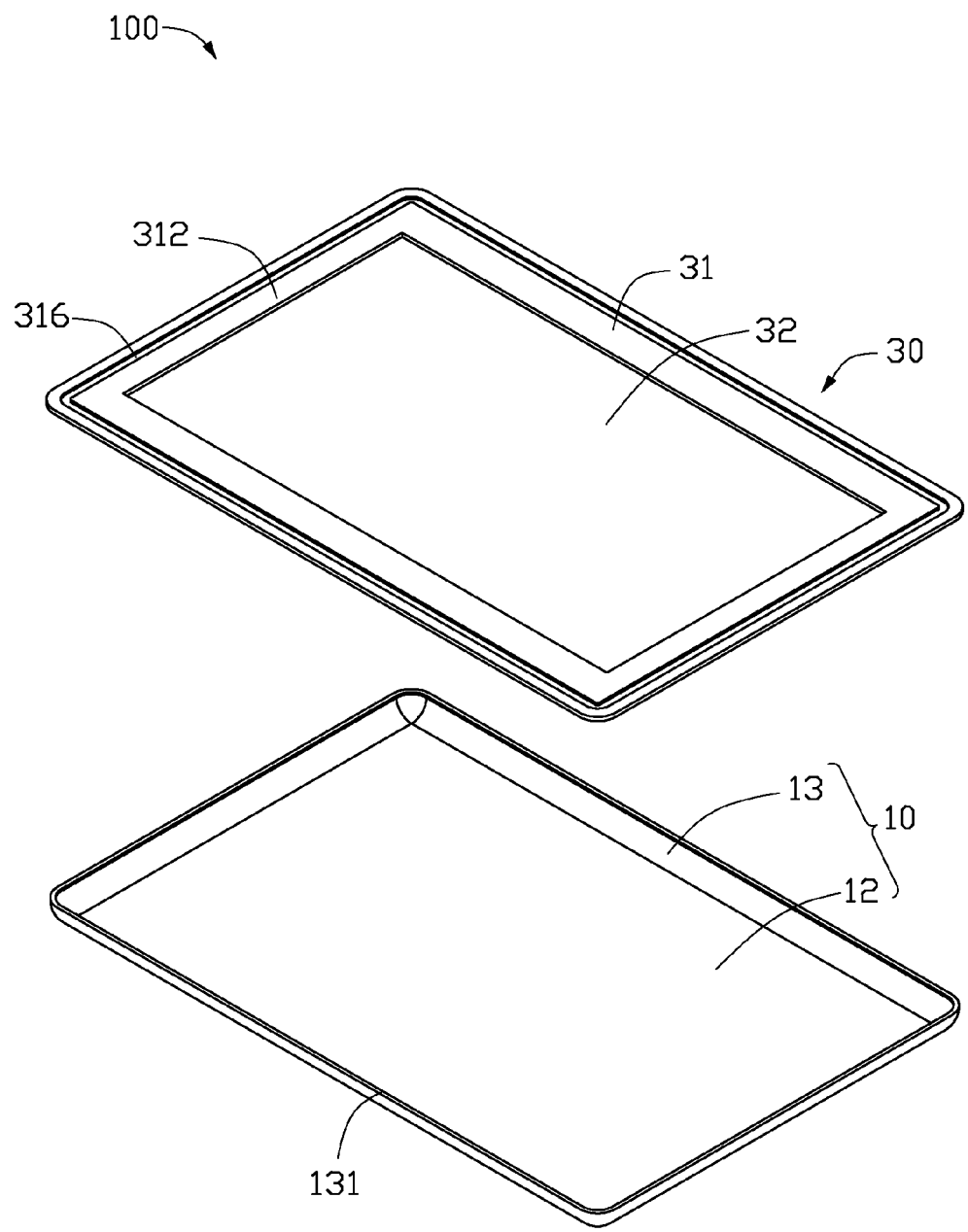
FIG. 2 is an exploded, isometric view of the housing shown in FIG. 1.
Figure 3:
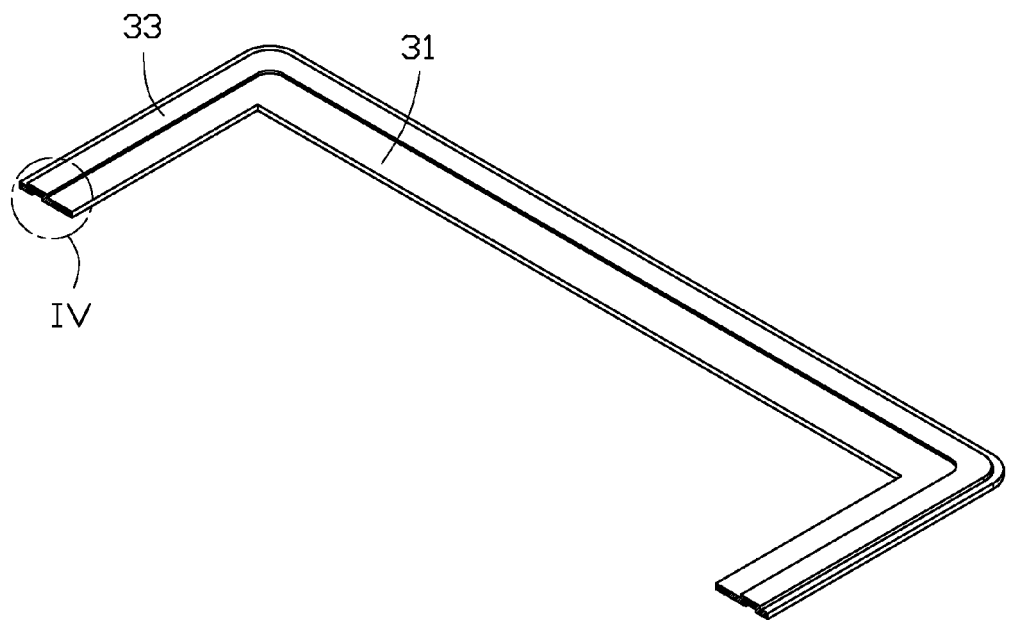
FIG. 3 is a cutout view of the top housing in FIG. 2.
Figure 4:
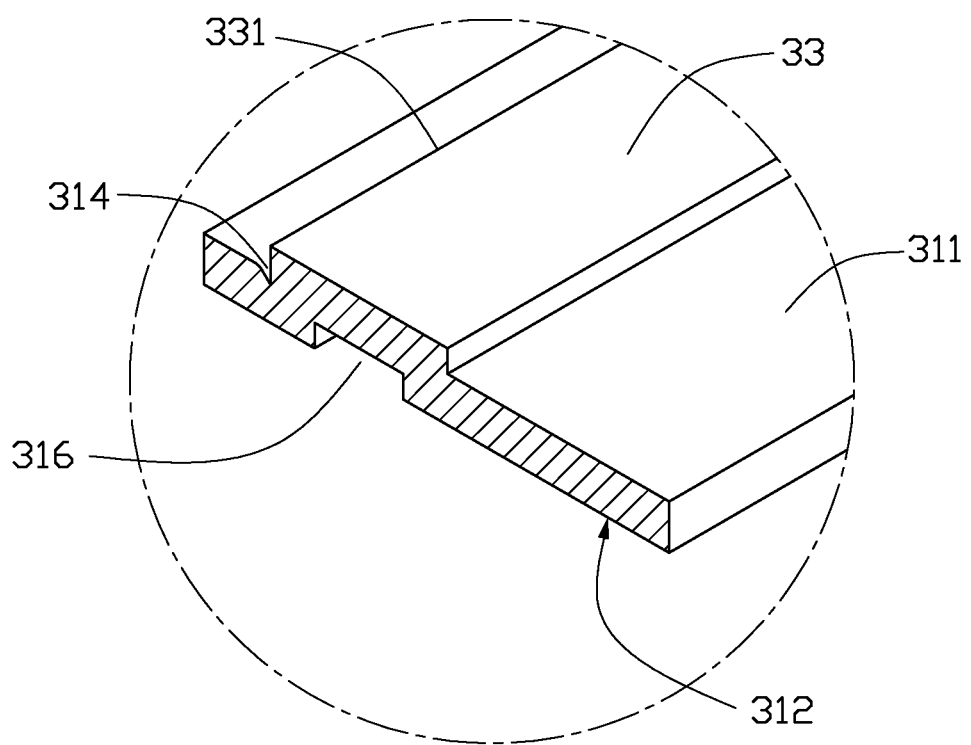
FIG. 4 is an enlarged view of a circled portion IV shown in FIG. 3
Figure 5:
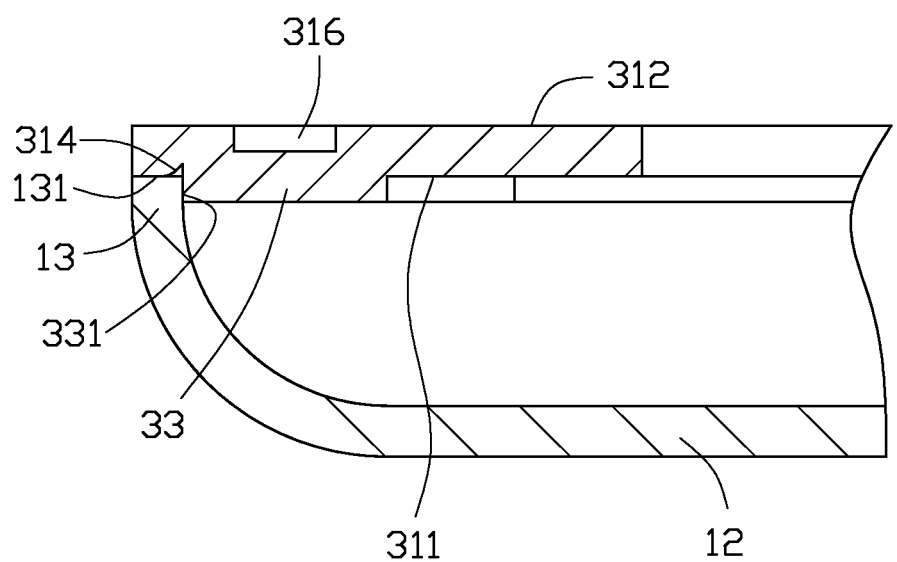
FIG. 5 is a partial, enlarged, cross-sectional view of FIG. 1, taken along line V-V.

Referring to FIGS. 1 and 2, one embodiment of a housing 100 includes a bottom housing 10 and a top housing 30. The bottom housing 10 is fixed to the top housing 30 by welding. The housing 100 can be a touch panel, a cell phone, a tablet computer, a PDA (Personal Digital Assistant), a digital photo frame or a liquid crystal display. In the illustrated embodiment, the housing 100 is a tablet computer.

The bottom housing 10 includes a base 12 and a peripheral wall 13. The peripheral wall 13 substantially perpendicularly extends from the edges of the base 12, and includes a connecting surface 131 at the top of the peripheral wall 13. The bottom housing 10 is fixed to the top housing 30 by welding at the connecting surface 131. In this embodiment, the base 12 is substantially rectangular. The peripheral wall 13 is substantially a rectangular frame. The connecting portion of the base 12 and the peripheral wall 13 is substantially curved. Four corners of the peripheral wall 13 are substantially curved.

Referring to FIGS. 2 through 5, the top housing 30 includes a main body 31. The main body 31 is substantially a rectangular frame, and defines a rectangular display opening 32. The main body 31 includes a bottom surface 311 and a top surface 312 on the opposite side of the bottom surface 311. An edge of the bottom surface 311 is fixed to the connecting surface 131 by welding. A receiving groove 314 is defined in the bottom surface 311. A cross-section of the receiving groove 314 is V-shaped. In the illustrated embodiment, the receiving groove 314 is a continuous groove surrounding the display opening 32. The width of the receiving groove 314 decreases along the direction from the bottom surface 311 to the top surface 312. As a result, the receiving groove 314 creates room in which molten slag that may have collected from welding can be contained, thereby effectively decreasing the gaps that may be formed between the bottom surface 311 and the connecting surface 131. Additionally, a mounting groove 316 is defined in the top surface 312. The mounting groove 316 surrounds the display opening 32, for mounting another structure, such as for example, a frame for decoration.

The top housing 30 further includes a rib 33 protruding out from the bottom surface 311 adjacent to the receiving groove 314, and surrounding the display opening 32, for reinforcing the structural strength of the main body 31. The rib 33 includes a side surface 331 near the receiving groove 314. The rib 33 is fittingly configured for the peripheral wall 13 of the bottom housing 10, so that the bottom housing 10 can be welded with the top housing 30. After welding, the side surface 331 will closely contact with the inner surface of the peripheral wall 13 of the bottom housing 10, for reinforcing the structural strength of the housing 100.

Figure 6:
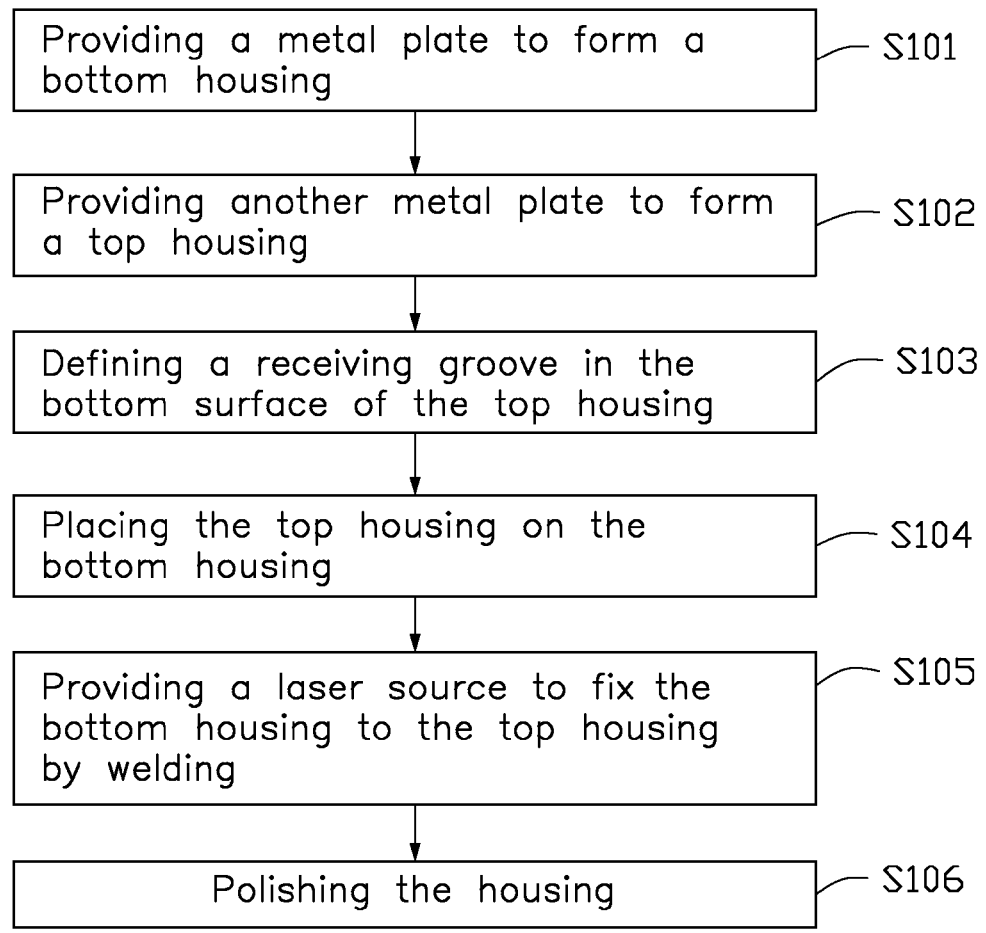
FIG. 6 is a flowchart for showing a method for making the housing of the embodiment.

Also referring to FIG. 6, a method for making the housing 100 of the illustrated embodiment is as follows.

In step 101, a metal plate is provided to form a bottom housing 10 by stamping, forging, or die casting. The bottom housing 10 includes a base 12 and a peripheral wall 13 substantially perpendicularly extending from the edges of the base 12.

In step 102, another metal plate is provided to form a top housing 30 by stamping, forging or die casting. The top housing 30 includes a main body 31 and a rib 33. The main body 31 defines a rectangular display opening 32. The main body 31 includes a bottom surface 311 and a top surface 312 on the opposite side of the bottom surface 311. A mounting groove 316 is defined in the top surface 312. The mounting groove 316 surrounds the display opening 32. The rib 33 protrudes out from the bottom surface 311, and surrounds the display opening 32.

In step 103, a receiving groove 314 is defined in the bottom surface 311 and adjacent to the rib 33 by CNC or chemical etching process.

In step 104, the top housing 30 is placed on the bottom housing 10. The connecting surface 131 contacts an edge of the bottom surface 311, and the inner surface of the peripheral wall 13 contacts the outside surface of the rib 33.

In step 105, a laser source (not shown) is provided. The laser beam generated from the laser source irradiates between the connecting surface 131 and the edge of the bottom surface 311, and welding the bottom housing 10 and the top housing 30 together. In this embodiment, an angle between the laser beam and the connecting surface 131 is ranged from 30 degrees to 60 degrees.

In step 106, the housing 100 is polished for the purpose of adding an aesthetic appeal to the housing 100 for consumers.

It should be pointed out that the sequence of performing step 101 and step 102 can be alternated. Also, the step 106 can be omitted as needed.

Due to the fact that a receiving groove 314 is defined in the bottom surface 311, and the molten slag may flow into the receiving groove 314, the gaps caused by molten slag collected between the bottom surface 311 and the connecting surface 131 can be effectively decreased, and the welding quality can be improved. Since an angle between the laser beam and the connecting surface 131 is ranged from 30 degrees to 60 degrees, a heated area between the connecting surface 131 and the bottom surface 311 can be enlarged, such that the peripheral wall 13 and the bottom surface 311 cannot be damaged during welding.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A housing, comprising:
    a bottom housing comprising a peripheral wall and a connecting surface on the top of the peripheral wall; and
    a top housing comprising a main body and a rib, wherein the main body comprises a bottom surface comprising an edge, the rib protrudes out from the bottom surface directly connected to the edge, the connecting surface is fixed to the edge of the bottom surface by welding, and a receiving groove is defined in the bottom surface between the edge and the rib to receive the molten slag generated and collected during a welding process, and a width of the receiving groove decreases along the direction away from the bottom surface; and
    the rib comprises a side surface near the receiving groove and the side surface closely contacts an inner surface of the peripheral wall of the bottom housing.

2. The housing of claim 1, wherein the bottom housing comprises a base and the peripheral wall extending from edges of the base.

3. The housing of claim 2, wherein the main body is substantially a rectangular frame, and defines a display opening.

4. The housing of claim 1, wherein a width of the receiving groove decreases along the direction away from the bottom surface.

5. The housing of claim 4, wherein the receiving groove is a continuous groove, and surrounds the display opening.

6. A housing, comprising:
    a bottom housing comprising a base and a peripheral wall extending from the edges of the base, wherein the peripheral wall comprises a connecting surface at the top thereof; and
    a top housing comprising a main body and a rib, wherein the main body comprises a bottom surface comprising an edge, the rib protrudes out from the bottom surface directly connected to the edge, the connecting surface is fixed to the of the bottom surface by welding, a receiving groove is defined in the bottom surface between the edge and the rib to receive molten slag generated and collected during a welding process, and a width of the receiving groove decreases along the direction away from the bottom surface; and
    the rib comprises a side surface near the receiving groove and the side surface closely contacts an inner surface of the peripheral wall of the bottom housing.

7. The housing of claim 1, wherein the rib comprises a side surface near the receiving groove and the side surface closely contacts the inner surface of the peripheral wall of the bottom housing.

8. The housing of claim 7, wherein the main body is substantially a rectangular frame, and defines a display opening.

9. The housing of claim 8, wherein the receiving groove is a continuous groove, and surrounds the display opening.

10. A method for making a housing, comprising:
    providing a metal plate to form a bottom housing having a connecting surface;
    providing another metal plate to form a top housing comprising a main body and a rib, the main body having a bottom surface comprising an edge, the rib protruding out from the bottom surface directly connected to the edge;
    defining a receiving groove in the bottom surface of the top housing between the edge and the rib;
    placing the top housing on the bottom housing, wherein the edge of the bottom surface contacts the connecting surface, and the receiving groove faces the connecting surface; and
    providing a laser source and welding the bottom housing and the top housing together, wherein molten slag generated during welding flows into the receiving groove.

11. The method for making a housing of claim 10, wherein the bottom housing comprises a base and a peripheral wall extending from the edges of the base, the peripheral wall comprises the connecting surface.

12. The method for making a housing of claim 11, wherein the rib comprises a side surface connected to the receiving groove, and the side surface closely contacts the inner surface of the peripheral wall.

13. The method for making a housing of claim 11, wherein the main body is substantially a rectangular frame, and defines a display opening.

14. The method for making a housing of claim 11, wherein an angle between the laser beam and the connecting surface is ranged from 30 degrees to 60 degrees.

* * * * *